(12) United States Patent
Nakamura et al.

(10) Patent No.: US 6,392,011 B1
(45) Date of Patent: May 21, 2002

(54) PROCESS FOR PRODUCING GRANULES OF A POLYVINYL CHLORIDE RESIN FOR PREPARATION OF PASTE

(75) Inventors: Eitaro Nakamura, Tokyo; Tadashi Takizawa, Takaoka; Manabu Makino, Takaoka; Tomoyuki Kose, Takaoka; Yoshimitu Nagatomo, Niihama, all of (JP)

(73) Assignee: Shin Dai-ichi Vinyl Corporation, Tokyo (JP)

( * ) Notice: Subject to any disclaimer, the term of this patent is extended or adjusted under 35 U.S.C. 154(b) by 0 days.

(21) Appl. No.: 09/600,992

(22) PCT Filed: Jan. 27, 1999

(86) PCT No.: PCT/JP99/00328

§ 371 Date: Jul. 26, 2000

§ 102(e) Date: Jul. 26, 2000

(87) PCT Pub. No.: WO99/37693

PCT Pub. Date: Jul. 29, 1999

(30) Foreign Application Priority Data

Jan. 27, 1998 (JP) ............................................. 10-014144
Jan. 27, 1998 (JP) ............................................. 10-014145
Feb. 27, 1998 (JP) ............................................. 10-064122

(51) Int. Cl.$^7$ .................................................. C08F 6/00
(52) U.S. Cl. ...................................................... 528/502
(58) Field of Search ........................................ 528/502

(56) References Cited

FOREIGN PATENT DOCUMENTS

| JP | 2-90977 | 3/1990 |
| JP | 2-133409 | 5/1990 |
| JP | 2-133410 | 5/1990 |
| JP | 2-225529 | 9/1990 |
| JP | 4-225033 | 8/1992 |
| JP | 5-117404 | 5/1993 |
| JP | 5-202197 | 8/1993 |

Primary Examiner—Terressa M. Boykin
(74) Attorney, Agent, or Firm—Armstrong, Westerman & Hattori, LLP

(57) ABSTRACT

Granules of a polyvinyl chloride resin for preparation of paste which comprise 10% by weight or less of components having diameters of 10 $\mu$m or smaller and less than 0.5% by weight of over size components after classification using a 149 $\mu$m standard sieve, have a bulk density of 0.45 to 0.58 g/cm$^3$ and give a plastisol comprising less than 0.3% by weight of over size components after classification using a 62 $\mu$m standard sieve, wherein the plastisol is obtained by mixing 100 g of the granules of a polyvinyl chloride resin and 50 g of dioctyl phthalate; and a process for producing granules of a polyvinyl chloride resin for preparation of paste which comprises spray-drying an aqueous dispersion of a vinyl chloride polymer obtained by emulsion polymerization or micro suspension polymerization of vinyl chloride or a mixture containing vinyl chloride and a monomer copolymerizable with vinyl chloride, classifying granular particles obtained by the spray-drying using ultrasonic vibration sieves which are equipped with a screen having an opening of 149 $\mu$m or smaller and removing the over size components.

4 Claims, 6 Drawing Sheets

-Prior Art-

PROCESS FOR PRODUCING GRANULES OF A POLYVINYL CHLORIDE RESIN FOR PREPARATION OF PASTE

TECHNICAL FIELD

The present invention relates to a process for producing granules of a polyvinyl chloride resin for preparation of paste. More particularly, the present invention relates to a process for producing granules of a polyvinyl chloride resin for preparation of paste which are produced from an aqueous dispersion of a vinyl chloride polymer obtained in accordance with emulsion polymerization or micro suspension polymerization, do not cause significant attachment of powder and exhibit excellent powder fluidity and excellent dispersion into plasticizers in preparation of paste (plastisol).

BACKGROUND ART

To prepare a polyvinyl chloride resin for preparation of paste, in general, an aqueous dispersion of a vinyl chloride. polymer which is obtained by emulsion polymerization or micro suspension polymerization of vinyl chloride or a mixture of vinyl chloride as the main component and a comonomer copolymerizable with vinyl chloride and contains primary particles having diameters of 0.05 to 5 $\mu$m as the main components and aggregates of the primary particle is used. Where necessary, surfactants and particles of a vinyl chloride polymer having diameters of primary particles of 0.2 to 2 $\mu$m are added to the aqueous dispersion in an amount of 5 to 30% by weight. The prepared mixture is spray-dried and a granular powder containing resin granules which are aggregates of polymer particles formed from individual droplets of the spray as the main components and aggregates of such resin granules is obtained.

Heretofore, the obtained granular powder is pulverized to prepare a fine polyvinyl chloride resin which is used for preparation of paste. Paste (generally referred to as plastisol or sol) is prepared by adding plasticizers and compounding ingredients such as heat stabilizers and fillers to the polyvinyl chloride resin and mixing the components.

The polyvinyl chloride resin for preparation of paste which has heretofore been used have some drawbacks due to fineness of the particles. For example, when a bag packed with the resin is opened for preparation of paste, dust of the resin powder is formed and the working environment is deteriorated. Powder fluidity of the resin is poor and automatic measurement and pneumatic transportation of the resin powder require sophisticated processes and large scale dust collectors. In Japanese Patent Application Laid-Open No. Heisei 2(1990)-133410, spherical granules of a polyvinyl chloride resin are proposed to improve these drawbacks. In Japanese Patent Application Laid-Open No. Heisei 2(1990)-225529, it is shown that resin granules which can be dispersed in a plasticizer without pulverization after drying are obtained by spray-drying using heated air having a specific humidity at a temperature lower than 100° C. However, the above processes have problems in that productivity of the drying apparatus is markedly low due to the spray-drying at a low temperature and that aggregates having large sizes which are formed by cleavage of resin layers attached to the inner face of the drying apparatus during the operation for a long time are mixed into the product and dispersion of the resin in the formed sol becomes poor.

In Japanese Patent Application Laid-Open No. Heisei 5(1993)-117404, it is disclosed that, even when the spray-drying is not conducted at a low temperature, a uniform polyvinyl chloride resin for preparation of paste can be obtained smoothly by removing grains having large sizes from a granular powder obtained after spray-drying using a pneumatic sieve of a fixed screen type. Although the granular powder obtained in accordance with this process exhibits excellent dispersion in plasticizers, the granular powder is polished by contacting the pneumatic sieve and fine particles having the size of the primary particles are formed. Therefore, the powder fluidity and the attachment of the powder to the inside of pipes for air transfer are not sufficiently improved.

In the production of granules of a polyvinyl chloride resin for preparation of paste, it has long been practiced that a screen having a specific opening or a plate having many holes of a specific size is fixed to a frame, the combination of the frame and the screen or the plate having many holes is vibrated and grains larger than the opening of the screen or the size of the holes are left on the screen or the plate. As the size of the powder decreases, the specific surface area of the powder increases and the relative surface energy becomes relatively greater. Therefore, in accordance with this method of classification, aggregation of particles and attachment of particles to the screen increase and efficiency of the classification markedly decreases as the size of the powder decreases. When a sieve allowing passage of powder by the weight of the powder itself is used, continuous classification of a powder having a diameter of particles of 200 $\mu$m or smaller is difficult. In the blower shifter process, which is a process for stable classification using a sieve having a relatively small opening such as that described above, powder is brought against the face of a screen at a high speed and passed through the screen by the kinetic energy of the powder. However, this process has drawbacks such as break down of the powder by the crushing against wires of the screen and attachment of powder having a low melting point by softening. Moreover, because a great amount of the air is required, an apparatus for separation of the powder which has passed the screen from the air stream becomes more expensive.

As the process for classification of fine powder which can overcome the drawbacks of the blower shifter process, a process using an ultrasonic vibration sieve has been developed. In the ultrasonic vibration sieve, an ultrasonically vibrated screen is attached to a frame vibrated at a lower frequency. The ultrasonic vibration sieve has been attracting attention as a remarkable sieve which can classify fine powder having diameters of 10 to 100 $\mu$m by a screen having an opening of about 30 to 200 $\mu$m. However, since the ultrasonic vibration is transferred from an oscillator to the screen directly or via a resonance plate, the area of the screen per one oscillator is naturally limited. To achieve uniform distribution of the ultrasonic vibration on the surface of the screen, a circular vibration sieve having a circular screen and a circular frame is used as the ultrasonic vibration sieve. The upper limit of the diameter of the screen per one oscillator is about 2,000 mm$\phi$. When the efficiency of the treatment per area of the screen is considered, an ultrasonic vibration sieve having a diameter of the screen of 1,000 mm$\phi$ or smaller exhibits a great efficiency. This means that a great number of ultrasonic vibration sieves are required for classification of a great amount of powder. When powder for the treatment is distributed to a plurality of sieves and classified, each sieve must be equipped with an apparatus for quantitative supply of the powder because, when the speed of the classification is smaller than the speed of supplying the powder, a portion of the powder which should have passed the sieve overflows the sieve as a component above the screen. When fluctuations in the speed of the classification is taken into consideration, it is also necessary that the amount of supply of the powder be limited to an amount smaller than the maximum amount which the sieve can handle. As the result, the required number of the ultrasonic vibration sieves increases and cost of the apparatuses increases.

When the classification of powder is conducted continuously, fine particles in the powder for the classification are attached to the wire of the screen and the attached powder grows. The speed of the classification decreases with time and performing the continuous classification becomes difficult. In general, fine particles having diameters of 10 μm or smaller exhibit strong attachment (stickiness). In the classification by the ultrasonic vibration sieve which is particularly advantageous for classification of fine powder, clogging due to attachment of fine particles is an inherent problem. Naturally, it has been strongly desired that the problem is overcome.

The present invention has an object to provide granules of a polyvinyl chloride resin for preparation of paste which do not cause significant attachment of powder and exhibit excellent powder fluidity and excellent dispersion into plasticizers in preparation of paste (plastisol) and a process for producing the granules.

DISCLOSURE OF THE INVENTION

As the result of intensive studies by the present inventors to overcome the above problems, it was found that granules of a polyvinyl chloride resin which do not cause significant attachment of powder and exhibit excellent powder fluidity and excellent dispersion into plasticizers in preparation of sol can be obtained by removing aggregates having large sizes causing poor dispersion into sol by classification from granular powder obtained by spray-drying an aqueous dispersion of a polyvinyl chloride resin for preparation of paste and suppressing formation of fine particles in the classification. The present invention has been completed based on the knowledge.

The present invention provides:
(1) A process for producing granules of a polyvinyl chloride resin for preparation of paste which comprises spray-drying an aqueous dispersion of a vinyl chloride polymer obtained by emulsion polymerization or micro suspension polymerization of vinyl chloride or a mixture containing vinyl chloride as a main component and a monomer copolymerizable with vinyl chloride, classifying granular particles obtained by the spray-drying using ultrasonic vibration sieves which are equipped with a screen having an opening of 149 μm or smaller, removing plus sieve components and obtaining granules of a polyvinyl chloride resin, for preparation of paste which comprise 10% by weight or less of components having diameters of 10 μm or smaller and less than 0.5% by weight of plus sieve components after classification using a 149 μm standard sieve in accordance with Japanese Industrial Standard, have a bulk density (loose) of 0.45 to 0.58 g/cm$^3$ and give a plastisol comprising less than 0.3% by weight of plus sieve components after classification using a 62 μm standard sieve in accordance with Japanese Industrial Standard, wherein the plastisol is obtained by placing 100 g of the granules of a polyvinyl chloride resin and 50 g of dioctyl phthalate in a cylindrical vessel having an inner diameter of 85 mm and mixing a resultant mixture by rotating a stirrer having four flat blades arranged in a form of a cross at a speed of 500 rpm for 5 minutes, each blade having a shape of a petal having a length of 35 mm from a center of a shaft of rotation, a width of 20 mm in a horizontal direction and a thickness of 0.7 mm and the stirrer being placed at a position such that lower faces of the blades are placed at a distance of 5 cm from a surface of a bottom of the vessel;
(2) A process for producing granules of a polyvinyl chloride resin for preparation of paste described in (1), wherein a temperature of heated air for drying which is used for the spray-drying is 100° C. or higher;
(3) A process for producing granules of a polyvinyl chloride resin for preparation of paste described in (1), wherein, to classify the granular particles obtained by the spray-drying by the ultrasonic vibration sieves which are equipped with a screen having an opening of 149 μm or smaller and remove the over size components, a plurality of ultrasonic vibration sieves are arrange in series and a portion of granular particles which overflow an ultrasonic vibration sieve at an upstream position after being supplied to said sieve is supplied to an ultrasonic vibration sieve at a downstream position and classified; and
(4) A process for producing granules of a polyvinyl chloride resin for preparation of paste described in (1), wherein, to classify the particles obtained by the spray-drying by the ultrasonic vibration sieves which are equipped with a screen having an opening of 149 μm or smaller and remove over size components, a floating brush is placed on a surface of the screen of an ultrasonically vibrating sieve.

BRIEF DESCRIPTION OF THE DRAWINGS

In FIG. 1 represents a stirrer, 2 represents a flat blade having a shape of a petal, 3 represents a fixing ring, 4 represents a shaft of a stirrer, 5 represents a first ultrasonic vibration sieve, 6 represents a second ultrasonic vibration sieve, 7 represents a third ultrasonic vibration sieve, 8 represents an ultrasonic vibration sieve and 9 represents a floating brush.

THE MOST PREFERRED EMBODIMENT TO CARRY OUT THE INVENTION

The granules of a polyvinyl chloride resin for preparation of paste of the present invention are aggregates of polyvinyl chloride resin particles for preparation of paste, comprise 10% by weight or less of components having diameters of 10 μm or smaller and less than 0.5% by weight of over size components after classification using a 149 μm standard sieve in accordance with Japanese Industrial Standard (a nominal 100 mesh sieve) and have a bulk density (loose) of 0.45 to 0.58 g/cm$^3$. By adjusting the content of the fine components having diameters of 10 μm or less in the resin granules, attachment of the resin granules to the inside of pipes during pneumatic transportation can be prevented and formation of dust during the operation of opening bags packed with the granules can be reduced. By adjusting the aggregates having large sizes, which are over size components after classification using a 149 µm standard sieve in accordance with Japanese Industrial Standard, to less than 0.5% by weight, the resin granules can be easily dispersed because granules of the resin can be easily separated into individual particles in mixing with a plasticizer and molded products having excellent appearance can be obtained due to the decreased amount of the grains having large sizes in the sol. By adjusting the bulk density (Goose) to 0.45 to 0.58 g/cm$^3$, excellent powder fluidity can be provided and the pneumatic transportation and the automatic measurement can be easily performed.

The granules of a polyvinyl chloride resin for preparation of paste of the present invention give a plastisol comprising less than 0.3% by weight of over size components after classification using a 62 µm standard sieve in accordance with Japanese Industrial Standard (a nominal 250 mesh sieve), wherein the plastisol is obtained by placing 100 g of the granules of a polyvinyl chloride resin and 50 g of dioctyl phthalate in a cylindrical vessel having an inner diameter of 85 mm and mixing a resultant mixture by rotating a stirrer having four flat blades arranged in a form of a cross at a speed of 500 rpm for 5 minutes, each blade having a shape of a petal having a length of 35 mm from the center of the shaft of rotation, a width of 20 mm in the horizontal direction and a thickness of 0.7 mm and the stirrer being placed at a position such that lower faces of the blades are placed at a distance of 5 mm from the surface of the bottom of the vessel.

Figure 1A:
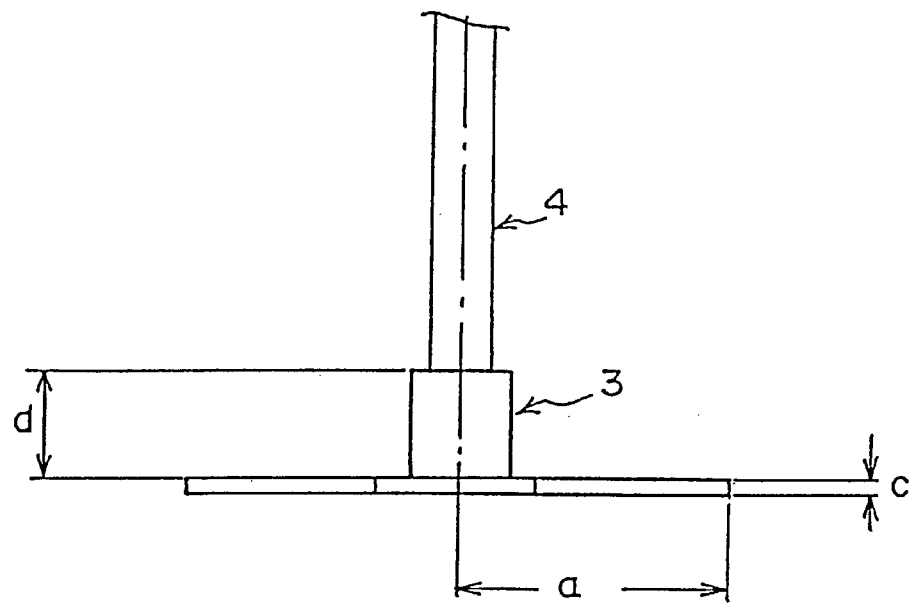
FIG. 1(A) and FIG. 1(B) show schematic diagrams exhibiting major portions of a stirrer.
Figure 1B:
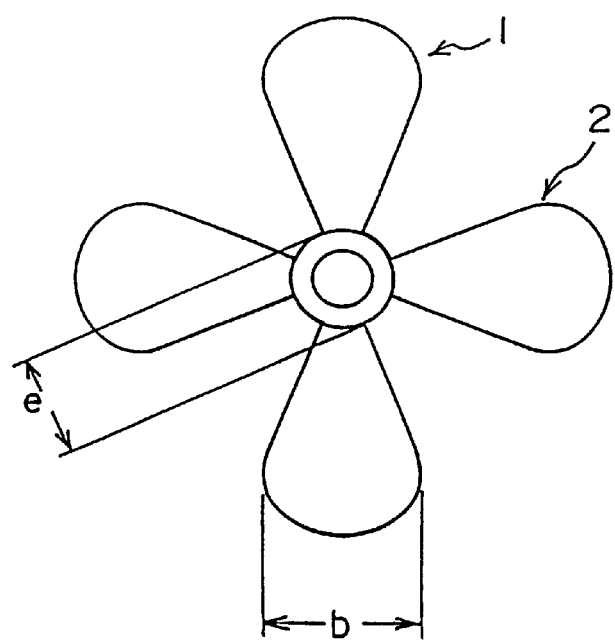

FIG. 1(A) and FIG. 1(B) show schematic diagrams exhibiting the shape of the stirrer. In the stirrer 1, four flat blades 2 each having a shape of a petal, a length a of 35 mm from the center of the shaft of rotation, a width b of 20 mm in the horizontal direction and a thickness c of 0.7 mm are fixed to a fixing ring 3 (the height of the ring d: 14 mm; and the outer diameter of ring e: 13 mm) at the lower end of the shaft of rotation 4 having a diameter of 8 mm and arranged in a form of a cross. The stirrer 1 having the above structure is placed at a position such that lower faces of the blades are placed at a distance of 5 mm from the surface of the bottom of the vessel and rotated. In order to achieve rapid passage of the plastisol through the sieve, the plastisol may be diluted with mineral spirit in about the same amount as the amount of the granules used as a material of the plastisol. In order to rapidly remove the plasticizer through the sieve from insufficiently dispersed grains on the sieve, washing with methanol may be conducted. By adjusting the amount of the over size components after classification using the 62 µm standard sieve in accordance with Japanese Industrial Standard obtained in the above condition to less than 0.3% by weight, the content of grains having large sizes in the plastisol can be reduced and molded products exhibiting excellent appearance with few striae or particulate protrusions can be prepared even when the plastisol is used for applications forming thin coating films.

The process for producing granules of a polyvinyl chloride resin for preparation of paste of the present invention comprises spray-drying an aqueous dispersion of a vinyl chloride polymer obtained by emulsion polymerization or micro suspension polymerization of vinyl chloride or a mixture containing vinyl chloride as a main component and a monomer copolymerizable with vinyl chloride, classifying granular particles obtained by the spray-drying using ultrasonic vibration sieves which are equipped with a screen having an opening of 149 µm or smaller, removing over size components and obtaining granules of a polyvinyl chloride resin for preparation of paste which comprise 10% by weight or less of components having diameters of 10 µm or smaller and less than 0.5% by weight of over size components after classification using a 149 µm standard sieve in accordance with Japanese Industrial Standard, have a bulk density (loose) of 0.45 to 0.58 g/cm$^3$ and give a plastisol comprising less than 0.3% by weight of over size components after classification using a 62 µm standard sieve in accordance with Japanese Industrial Standard, wherein the plastisol is obtained by placing 100 g of the granules of a polyvinyl chloride resin and 50 g of dioctyl phthalate in a cylindrical vessel having an inner diameter of 85 mm and mixing a resultant mixture by rotating a stirrer having four flat blades arranged in a form of a cross at a speed of 500 rpm for 5 minutes, each blade having a shape of a petal having a length of 35 mm from the center of the shaft of rotation, a width of 20 mm in the horizontal direction and a thickness of 0.7 mm and the stirrer being placed at a position such that lower faces of the blades are placed at a distance of 5 mm from the surface of the bottom of the vessel.

It is preferable that the polymer used for the granules of a polyvinyl chloride resin for preparation of paste of the present invention is aggregates of the polymers having a shape of a sphere, a shape of an ellipsoid having a ratio of the major axis to the minor axis of about 1:1 to 1:0.8 or a shape of a deformed ellipsoid. The aggregates of the polymers can be obtained by emulsion polymerization (including seeded emulsion polymerization) or micro suspension polymerization (including seeded micro suspension polymerization) of vinyl chloride or a mixture of vinyl chloride and a monomer copolymerizable with vinyl chloride. Granules of the resin exhibiting excellent fluidity can be obtained by using granules of the polymer having a shape of a sphere or close to a sphere.

In the present invention, the monomer copolymerizable with vinyl chloride is not particularly limited. Examples of the monomer include olefinic compounds such as ethylene and propylene, vinyl esters such as vinyl acetate and vinyl propionate, unsaturated monocarboxylic acids such as acrylic acid and methacrylic acid, esters of unsaturated monocarboxylic acids such as methyl acrylate, ethyl acrylate, n-butyl acrylate, 2-hydroxyethyl acrylate, methyl methacrylate, ethyl methacrylate and N,N-dimethylaminoethyl methacrylate, unsaturated amides such as acrylamide and methacrylamide, unsaturated nitriles such as acrylonitrile and methacrylonitrile, unsaturated dicarboxylic acids such as maleic acid and fumaric acid, esters and anhydrides of unsaturated dicarboxylic acids, N-substituted maleimides, vinyl ethers such as vinyl methyl ether and vinyl ethyl ether, and vinylidene compounds such as vinylidene chloride. It is preferable that the monomer copolymerizable with vinyl chloride is used in an amount less than 50% by weight of the total amount of the monomers.

In the emulsion polymerization, water as the medium, an anionic or nonionic emulsifier and a polymerization initiator soluble in water are used and a monomer is polymerized at the inside of micelles of the emulsifier. A latex containing minute spherical polymer particles having a distribution of the diameter of a sharp mode, i.e., the diameter of the particle distributed within the range of 0.05 to 0.5 µm, is obtained.

In the seeded emulsion polymerization, the polymer particles obtained in accordance with the emulsion polymerization are used as the seeds and a monomer is polymerized in an aqueous media on the seeds so that the seeds are covered with the polymer and grow. In this process, polymerization is conducted using a polymerization initiator soluble in water while an anionic emulsifier for stabilization of the polymer particles is added in accordance with the progress of the polymerization reaction so that the amount of the emulsifier does not exceed the amount necessary for covering the surface of the polymer particles. In general, a polymer latex containing particles grown to diameters of 0.9 to 1.3 $\mu$m as a major group of particles and a relatively small amount of particles having diameters of 0.1 to 0.3 $\mu$m as a minor group of byproducts is obtained.

In the micro suspension polymerization, a monomer is homogenized in an aqueous medium in the presence of a polymerization initiator soluble in oils and an anionic emulsifier using a homogenizer. The polymerization is conducted while the mixture is relatively mildly stirred. In general, a polymer latex containing spherical polymer particles with a broad distribution of diameters of primary particles, i.e., in the range of 0.05 to 5 $\mu$m, is obtained.

The anionic emulsifier used in the process of the present invention is not particularly limited. Examples of the emulsifier include salts of alkylbenzenesulfonic acids such as sodium dodecylbenzenesulfonate, salts of alkylsulfuric acids such as sodium laurylsulfate and sodium tetradecylsulfate, salts of sulfosuccinic acids such as sodium dioctylsulfosuccinate and sodium dihexylsulfosuccinate, salts of fatty acids such as sodium laurate and intermediately hardened potassium salts of fatty acids of tallow, ethoxysulfate salts such as sodium polyoxyethylene lauryl ether sulfate and sodium polyoxyethylene nonylphenyl ether sulfate, salts of alkanesulfonic acids and ester salts of alkyl ether phosphoric acids. The amount of the emulsifier is not particularly limited and may be suitably selected in accordance with the process of polymerization. The amount is generally 0.2 to 2.5 parts by weight per 100 parts by weight of the monomer. Nonionic surfactants such as polyoxyethylene nonylphenyl ether and polyoxyethylene sorbitane lauryl ester may be used in combination with the anionic emulsifier. In the emulsion polymerization and the micro suspension polymerization, lipophilic auxiliary emulsifiers such as higher alcohols and sorbitane stearyl ester may also be added.

The polymerization initiator used in the process of the present invention is not particularly limited. Examples of the polymerization initiator include polymerization initiators soluble in water and polymerization initiators soluble in oils. Examples of the polymerization initiator soluble in water include compounds soluble in water such as potassium persulfate, ammonium persulfate and hydrogen peroxide and redox initiators which are combinations of these initiators or hydroperoxides described later with reducing agents such as sodium hydrogensulfite, a complex salt of sodium ethylenediaminetetraacetic acid with ion(I) ion, ammonium sulfite, ascorbic acid and iron(I) pyrophosphate. Examples of the polymerization initiator soluble in oils include organic peroxides such as diacyl peroxides such as acetyl peroxide, 3,5,5-trimethylhexanoyl peroxide, lauroyl peroxide, benzoyl peroxide and naphthoyl peroxide, ketone peroxides such as methyl ethyl ketone peroxide, hydroperoxides such as cumene hydroperoxide, p-cymene hydroperoxide, diisopropylbenzene hydroperoxide, t-butyl hydroperoxide, t-pentyl hydroperoxide and p-menthane hydroperoxide, peroxyesters such as t-butyl peroxypivalate, peroxydicarbonates such as diisopropyl peroxy-dicarbonate and diethylhexyl peroxydicarbonate and sulfonylperoxides such as acetyl cylcohexyl sulfonylperoxide; and azo compounds such as 2,2'-azobisisobutyronitrile, 2,2'-azobis(2-methylbutyronitrile), 2,2'-azobis-(2,4-dimethylvaleronitrile) and 2,2'-azobis(4-methoxy-2,4-dimethyl-valeronitrile).

The concentration of the aqueous dispersion of the vinyl chloride polymer used in the present invention is not particularly limited. The concentration is preferably 20 to 75% by weight and more preferably 40 to 70% by weight.

In the process of the present invention, the vinyl chloride polymer obtained in accordance with the emulsion polymerization or the micro suspension polymerization is spray-dried. The apparatus used for the spray-drying is not particularly limited. For example, apparatuses for spray-drying equipped with an atomizer such as an atomizer of the rotating disk type, the two fluid nozzle type or the pressurized nozzle type can be used. The air for the drying can be taken from the atmospheric air and can be used without adjustment of humidity.

The temperature of the air for drying at the inlet is preferably 80 to 190° C. and more preferably 100 to 175° C. The temperature at the outlet is preferably 40 to 70° C. and more preferably 45 to 55° C. The content of water in the dried granular particles is preferably 0.05 to 1.5% by weight and more preferably 0.1 to 1.0% by weight. The content of water in the dried granular particles can be adjusted by controlling the speed of supply of the aqueous dispersion of the vinyl chloride polymer and the temperature and the amount of the supplied air for drying. The diameter of the droplets in the spray can be adjusted by controlling the speed of supply and the concentration of solid components of the aqueous dispersion of the vinyl chloride polymer as the main controlling factor. The diameter of the droplets can also be adjusted by controlling, as the other major controlling factor, the number of rotation of the disk when the atomizer of the rotating disk type is used, the pressure and the amount of the air for atomizing when the atomizer of the two fluid nozzle type is used or the pressure when the atomizer of the pressurized Nozzle type is used. By spray-drying the aqueous dispersion of the vinyl chloride polymer, granular particles having an average particle diameter of 20 to 100 $\mu$m can be obtained.

The granular particles obtained by spray-drying the aqueous dispersion frequently contain aggregates having large sizes which are not easily separated to individual small grains in a plasticizer in the preparation of a plastisol such as aggregates grown to large sizes and fragments formed by cleavage of powder layers attached to inner walls of drying apparatuses and ducts. In the process for producing granules of a polyvinyl chloride resin for preparation of paste of the present invention, to remove the above grains having large sizes, a step of classification by an ultrasonic vibration sieve is conducted after the spray-drying and the over size components are removed. It is preferable that the ultrasonic vibration sieve used in the process of the present invention is a sieve having a structure such that the screen of the sieve is connected to an ultrasonic oscillator directly-or via a transferring medium and the screen itself ultrasonically vibrates. For the ultrasonically vibrating screen, it is preferable that one or more screens are fixed to a frame and the frame is vibrated by a vibrating motor or a rotating eccentric weight in a slower movement so that movement of powder is promoted. The frequency of the ultrasonic vibration is preferably 10 to 50 kHz and more preferably 30 to 40 kHz. It is preferable that the frequency of the vibration of the frame is 20 to 2,000 Hz which is sufficiently smaller than the frequency of vibration of the screen itself.

Examples of such an ultrasonic vibration sieve include "RESONASIEVE" manufactured by TOKUJU Corporation, "ULTRASONIC" manufactured by KOEI SANGYO Co., Ltd., "SONOSCREEN" manufactured by SARA KOGYO Co., Ltd., "ULTRASONIC VIBRATION SIEVE" manufactured by DALTON Co., Ltd. and "COMPACT SIEVE" manufactured by RUSSEL Co., Ltd. The opening of the screen of the ultrasonic vibration sieve used in the process of the present invention is 149 µm or smaller, preferably 70 to 149 µm and more preferably 109 to 149 µm. When the opening exceeds 149 µm, there is the possibility that grains having large sizes are mixed into the resin granules and cause striae and particulate protrusions on molded products using the paste.

The granular particles supplied on the screen of the sieve can be continuously classified by the ultrasonically vibrating screen. Friction between the granular powder and the screen is small and polishing between granules of the powder does not significantly take place. Therefore, cleavage of fine primary particles from the surface of the resin granules is suppressed. In the classification by a conventional sieve with slow vibration using a vibration motor alone, continuous classification by a sieve having an opening as small as 149 µm or smaller is almost impossible due to attachment of fine powder to the screen.

As described above, the granules of a polyvinyl chloride resin for preparation of paste of the present invention contain only a small amount of fine particles. Moreover, the amount of the over size components after classification using the 149 µm standard sieve in accordance with Japanese Industrial Standard is less than 0.5% by weight and preferably less than 0.1% by weight. Because the resin granules of the present invention contain only a small amount of fine powder, attachment of the granules does not significantly take place. The bulk density (loose) is 0.45 to 0.58 g/cm$^3$ and preferably 0.48 to 0.56 g/cm$^3$. The resin granules of the present invention exhibit excellent powder fluidity due to the high bulk density (loose).

To prepare a plastisol by using the granules of a polyvinyl chloride resin for preparation of paste of the present invention, a process conventionally used for preparation of a plastisol of a polyvinyl chloride resin can be used. The granules of a polyvinyl chloride resin for preparation of paste are mixed with plasticizers and various additives such as heat stabilizers, fillers, blowing agents, blowing accelerators, surfactants, viscosity modifiers, adhesive agents, coloring agents, diluents, ultraviolet light absorbents, antioxidants, reinforcing agents and other resins, where necessary. A plastisol is prepared by mixing the components sufficiently by a planetary mixer, a kneader, a roll or a Raikaiki (a mortar and pestle type mixer) so that the mixture becomes uniform.

The plasticizer used for preparation of the plastisol is not particularly limited. Examples of the plasticizer include derivatives of phthalic acid such as dibutyl phthalate, diisobutyl phthalate, diheptyl phthalate, di-(2-ethylhexyl) phthalate, di-n-octyl phthalate, dinonyl phthalate, diisodecyl phthalate, diundecyl phthalate, dicyclohexyl phthalate, butyl benzyl phthalate and diphenyl phthalate; derivatives of isophthalic acid such as di(2-ethylhexyl) isophthalate and diisooctyl isophthalate; derivatives of tetrahydrophthalic acid such as di(2-ethylhexyl) tetrahydrophthalate, di-n-octyl tetrahydrophthalate and diisodecyl tetrahydrophthalate; derivatives of adipic acid such as di-n-butyl adipate, di-(2-ethylhexyl) adipate, diisononyl adipate and diisodecyl adipate; derivatives of azelaic acid such as di-n-hexyl azelate, di-(2-ethylhexyl) azelate and diisooctyl azelate; derivatives of sebacic acid such as di-n-butyl sebacate and di-(2-ethylhexyl) sebacate; derivatives of maleic acid such as dimethyl maleate, diethyl maleate, di-n-butyl maleate and di-(2-ethylhexyl) maleate; derivatives of fumaric acid such as di-n-butyl fumarate and di-(2-ethylhexyl) fumarate; derivatives of trimellitic acid such as tri-n-hexyl trimellitate, tri(2-ethylhexyl) trimelitate, tri-n-octyl trimellitate, triisooctyl trimellitate, triisononyl trimellitate and triisodecyl trimellitate; derivatives of pyromellitic acid such: as tetra-n-octyl pyromellitate and tetra-(2-ethylhexyl) pyromellitate; derivatives of citric acid such as triethyl citrate, tri-n-butyl citrate, acetyl triethyl citrate and acetyl tri-(2-ethylhexyl) citrate; derivatives of itaconic acid such as monomethyl itaconate, monobutyl itaconate, dimethyl itaconate, diethyl itaconate, dibutyl itaconate and di-(2-ethylhexyl) itaconate; derivatives of oleic acid such as butyl oleate, glyceryl monooleate and diethylene glycol monooleate; derivatives of ricinolic acid such as glyceryl monoricinolate and diethylene glycol monoricinolate; derivatives of stearic acid such as glycerol monostearate and diethylene glycol distearate; derivatives of fatty acids such as diethylene glycol monolaurate, diethylene glycol diperalgonate and pentaerythritol fatty acid esters; derivatives of phosphoric acid such as triethyl phosphate, tributyl phosphate, tri-(2-ethylhexyl) phosphate, triphenyl phosphate, cresyl diphenyl phosphate, tricresyl phosphate and tris(chloroethyl) phosphate; derivatives of glycols such as diethylene glycol dibenzoate, dipropylene glycol dibenzoate, triethylene glycol dibenzoate and dibutyl methylenebisthioglycolate; derivatives of glycerol such as glycerol monoacetate, glycerol triacetate and glycerol tributyrate; plasticizers of polyesters such as polyesters derived from adipic acid, polyesters derived from sebacic acid and polyesters derived from phthalic acid; partially hydrogenated terphenyl; adhesive plasticizers; and polymerizable plasticizers such as diallyl phthalate, acrylic monomers and acrylic oligomers. The plasticizer may be used singly or in combination of two or more types. Among these plasticizers, plasticizers of phthalic esters are preferably used. The amount of the plasticizer is preferably 40 to 250 parts by weight per 100 parts by weight of the granules of a polyvinyl chloride resin.

To reduce viscosity of the plastisol without softening the molded product to a degree more than necessary, a portion of the plasticizer may be replaced with organic liquids having low boiling points which are vaporized during molding by heating such as mineral spirit, terpene, kerosine, butylcellosolve and 2,2,4-trimethyl-1,3-pentanediol monoisobutyrate.

To enhance hardness of the molded products or to make mat finish of the molded product, polyvinyl chloride resins for blending having an average particle diameter of 10 to 60 µm, which are known as blend resins or extender resins, may be mixed with the granules of a polyvinyl chloride resin for preparation of paste of the present invention and the properties of the plastisol may be adjusted.

Since grains having large sizes have been removed by the ultrasonic vibration sieve from the granules of a polyvinyl chloride resin for preparation of paste of the present invention, the granules are easily broken into individual particles and dispersed into the plasticizers. When the granules are used for coating, formation of striae and particulate protrusions on the surface of molded products is suppressed and molded products exhibiting excellent appearance can be obtained.

The granules of a polyvinyl chloride resin for preparation of paste of the present invention can be sufficiently broken into individual particles even when the resin granules and plasticizers are mixed together in a mixing vessel equipped with mixing blades having small shearing ability and pumping ability. The excellent dispersibility of the granules into plasticizers can be easily understood from this phenomenon. Specifically, 100 g of the resin granules of the present invention and 50 g of dioctyl phthalate are placed into a cylindrical vessel having an inner diameter of 85 mm. At the center of the cylindrical vessel in the horizontal direction, a stirrer 1 shown in FIG. 1 is placed. In the stirrer 1, four flat blades 2 each having a shape of a petal, a length a of 35 mm from the center of the shaft of rotation, a width b of 20 mm in the horizontal direction and a thickness c of 0.7 mm are fixed to a fixing ring 3 (the height of the ring d: 14 mm; and the outer diameter of ring e: 13 mm) at the lower end of the shaft of rotation 4 having a diameter of 8 mm and arranged in a form of a cross. The stirrer 1 having the above structure is placed at a position such that lower faces of the blades are placed at a distance of 5 mm from the surface of the bottom of the vessel. The resin granules and the plasticizer in the vessel are mixed by rotation of the blades at the speed of 500 rpm for 5 minutes. The obtained plastisol has over size components on the 62 $\mu$m standard sieve in accordance with Japanese Industrial Standard in an amount as very small as less than 0.3% by weight and preferably less than 0.1% by weight.

Figure 2:
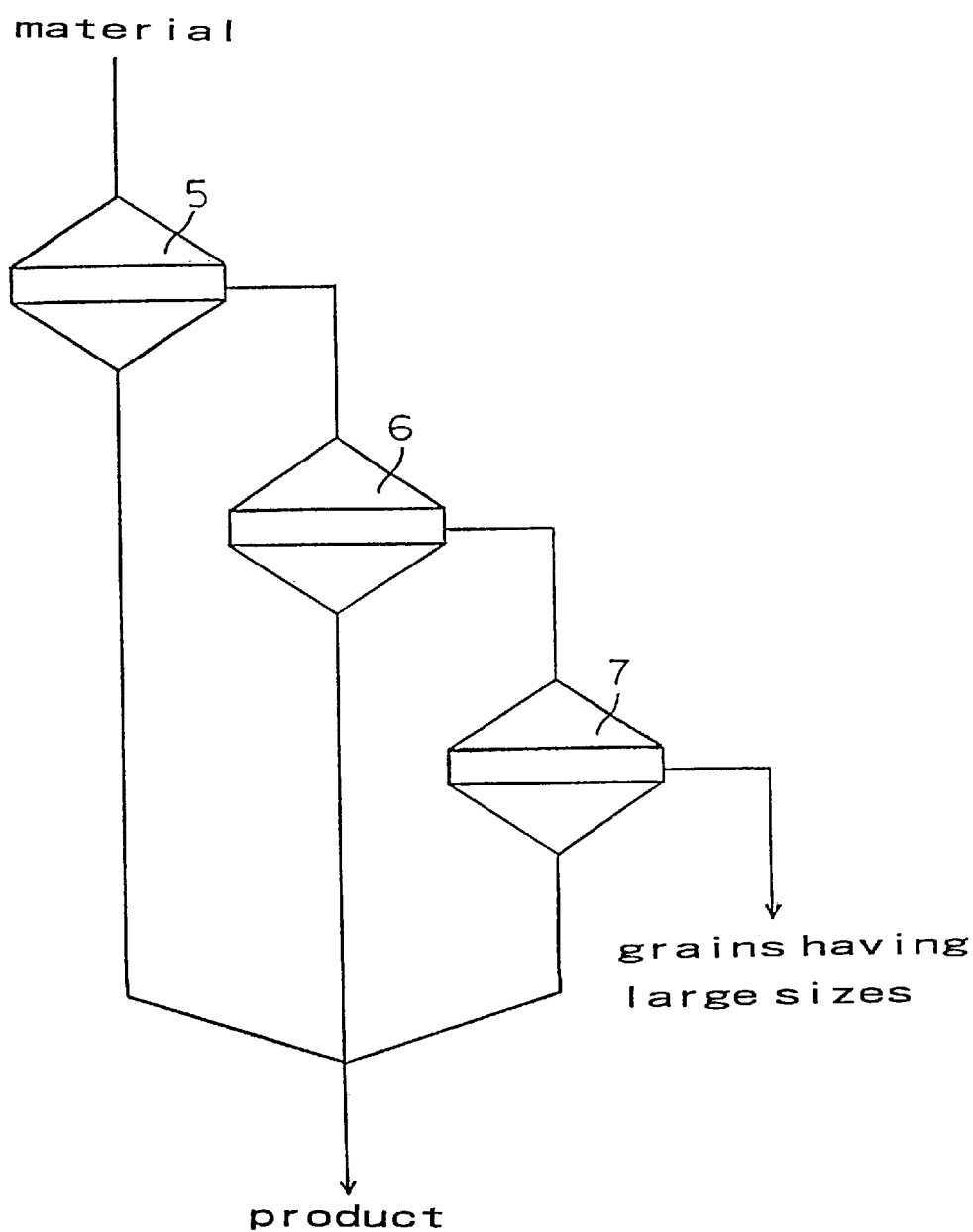
FIG. 2 shows a flow diagram of an embodiment of the process for classification of granular powder used in the process of the present invention.

In the process of the present invention, a plurality of ultrasonic vibration sieves having openings of 149 $\mu$m or smaller are arranged in series and a portion of granular particles which overflow an ultrasonic vibration sieve at an upstream position after being supplied to this sieve is supplied to an ultrasonic vibration sieve at a downstream position and classified. FIG. 2 shows a flow diagram of an embodiment of the process for classification of granular powder used in the process of the present invention. In this embodiment, three ultrasonic vibration sieves are arranged in series. The material powder supplied to the inlet of the first ultrasonic vibration sieve 5 is continuously discharged from outlets above and below the screen. The outlet above the screen of the first ultrasonic vibration sieve is connected to the inlet of the second ultrasonic vibration sieve 6 via canvas or the like and the portion of the material powder overflowing into the second ultrasonic vibration sieve is classified again into components above and below the screen by the second ultrasonic vibration sieve. In the same manner, the outlet above the screen of the second ultrasonic vibration sieve is connected to the inlet of the third ultrasonic vibration sieve 7 and the portion of the material powder overflowing into the third ultrasonic vibration sieve is classified into components above and below the screen by the third ultrasonic vibration sieve.

Figure 3:
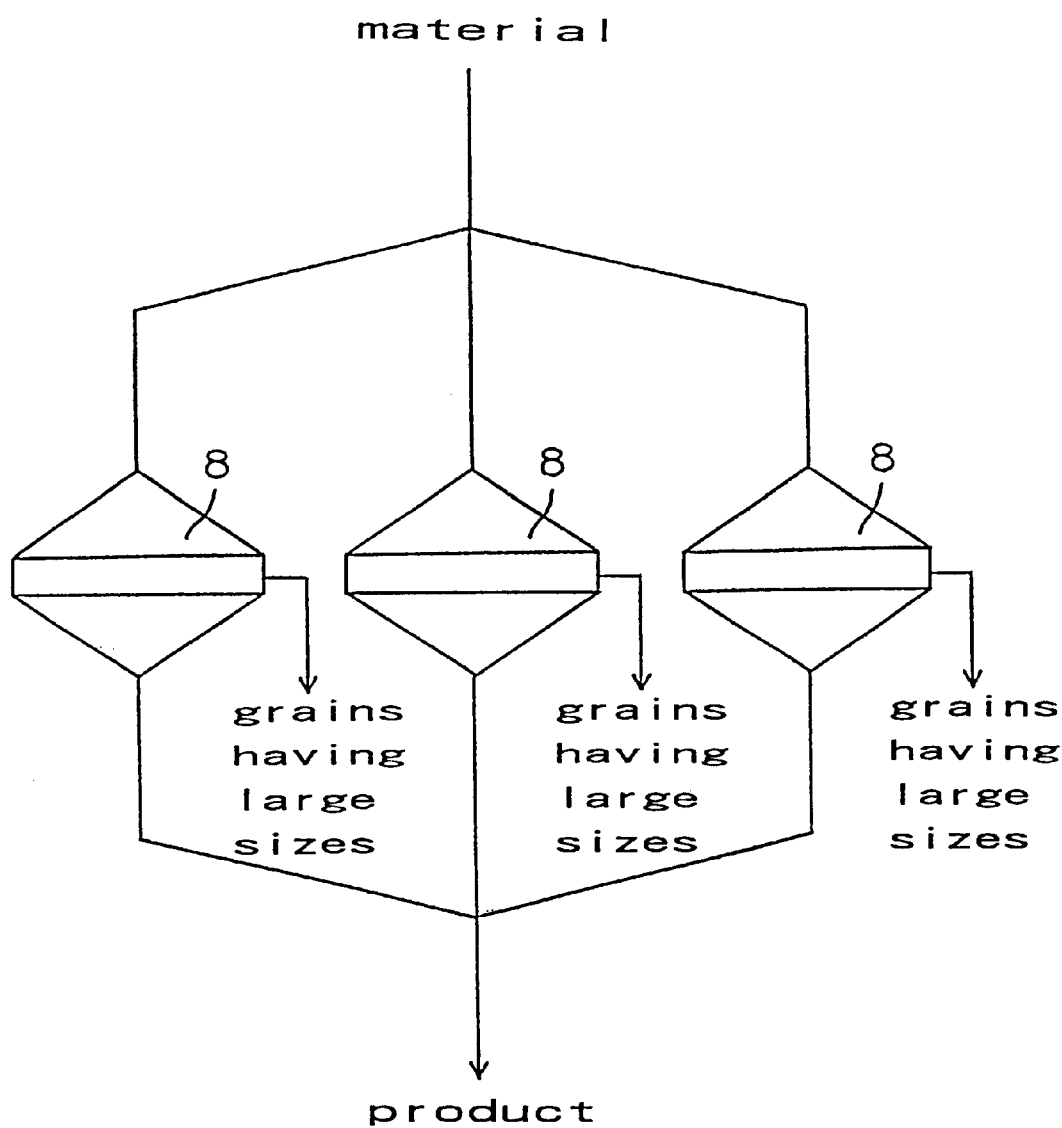
FIG. 3 shows a flow diagram of a conventional process for classification using ultrasonic vibration sieves in parallel.

In the process of the present invention, the number of the ultrasonic vibration sieves arranged in series is not particularly limited as long as the transfer of the powder can be made smoothly. In general, the powder can be sufficiently effectively classified by two or three ultrasonic vibration sieves. The entire faces of the screens of the ultrasonic vibration sieves arranged in series are covered with the powder except the surface of the screen of the last ultrasonic vibration sieve. Therefore, the entire surface of the screens can be used as the sieve and the weight of the layer of the powder accelerates passage of the powder through the screens. It is considered that the great increase in the ability of classification can be achieved by the above reason. FIG. 3 shows a flow diagram of a conventional process for classification using ultrasonic vibration sieves arranged in parallel. In this process, three ultrasonic vibration sieves 8 are arranged in parallel. In accordance with the process of the present invention, an ability of classification which is 1.5 to 2 times as great as that of a conventional process can be achieved by using the same number of ultrasonic vibration sieves.

In the process of the present invention, an ultrasonic vibration sieve having a wire of a screen plated with a metal can be used. Examples of the wire for plating a metal include metal wires such as stainless steel wires, brass wires and phosphorus bronze wires and organic fibers such as polyester fibers and polyamide fibers. Examples of the metal used for the plating include nickel, chromium, copper and gold. By forming a smooth surface of the wire by the metal plating, attachment of fine particles to the surface of the wire of the screen can be prevented and efficient classification can be achieved.

In the process of the present invention, a floating brush can be placed on the surface of the ultrasonically vibrating screen in the classification of the granules using the ultrasonic vibration sieve having an opening of 149 $\mu$m or smaller. When the ultrasonic vibration sieve is used, the passage of the granular particles through the screen is accelerated by the ultrasonic vibration of the screen itself and attachment of the fine particles to the screen can be prevented. However, the smaller the granules, the greater the tendency of the attachment. Therefore, in the continuous operation of classification, fine particles are gradually accumulated and attached to the wire of the screen. It tends to take place that fine particles finally cover the entire surface of the screen and clogging takes place. By placing a floating brush on the surface of the screen of the ultrasonically vibrating sieve, the clogging of the surface of the screen can be prevented.

In the process of the present invention, the floating brush is a brush which is not fixed to any of the surface of the screen, the frame of the sieve and driving apparatuses and moves on the surface of the screen by the ultrasonic vibration while the brush is kept in contact with the surface of the screen. The floating brush may be a single brush or a group of brushes formed by connecting a plurality of brushes to one another. It is preferable that the maximum length of the brush or the group of brushes is greater than one half of the diameter of the frame of the sieve and smaller than the diameter of the frame of the sieve. By adjusting the length of the brush or the group of brushes to a length greater than one half of the diameter of the frame of the sieve and smaller than the diameter of the frame of the sieve, the entire surface of the screen can be brushed by the brush floating on the surface of the screen.

Figure 4:
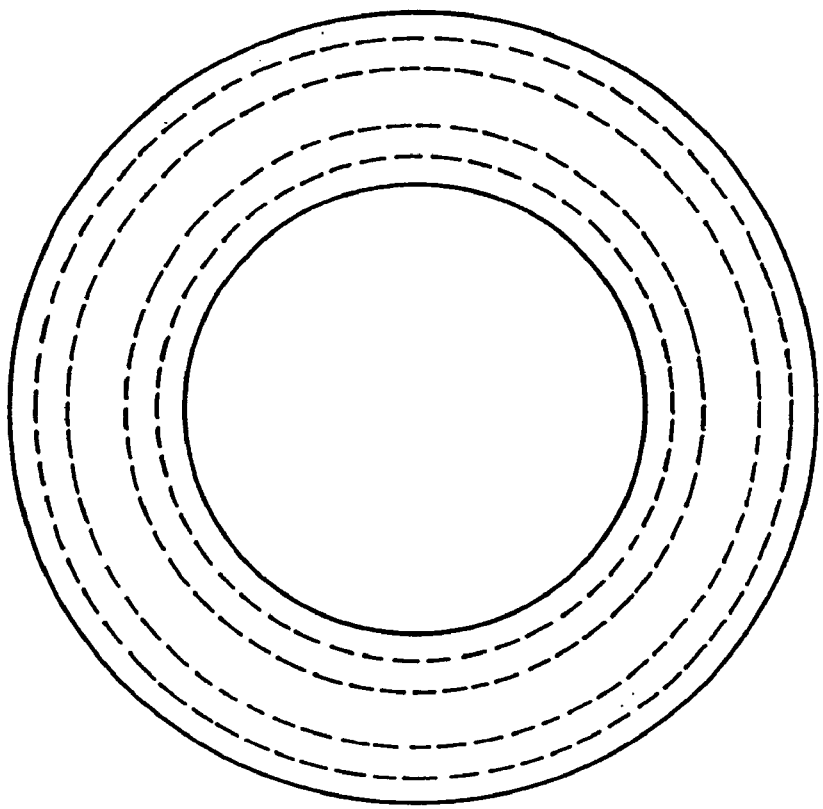
FIG. 4 shows a bottom plan view and a sectional view of an embodiment of the floating brush used in the process of the present invention.
Figure 4:
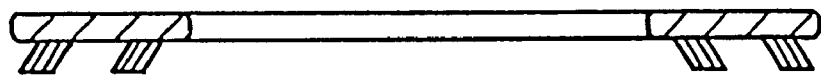
Figure 5:
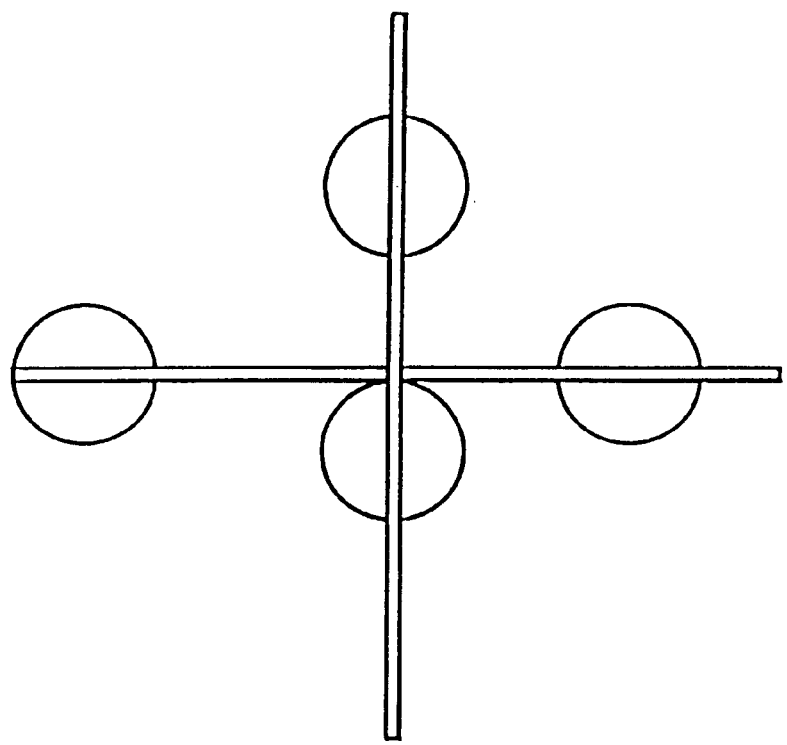
FIG. 5 shows a plan view of another embodiment of the floating brush used in the present invention.
Figure 6:
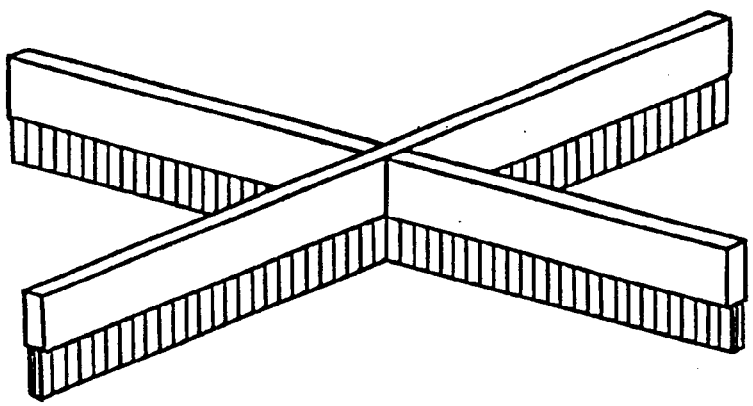
FIG. 6 shows a perspective view of another embodiment of the floating brush used in the present invention.

FIG. 4 shows a bottom plan view and a sectional view of an embodiment of the floating brush used in the process of the present invention. The brush of the present embodiment is a ring brush in which two rows of nylon monofilaments are planted along concentric circles on a doughnut-shaped disk made of a nylon resin. Each row has two lines of the nylon monofilaments along two concentric circles and the nylon monofilaments are planted at alternating positions in the lines. FIG. 5 shows a plan view of another embodiment of the floating brush used in the present invention. In this embodiment of the floating brush, a frame of a cross shape is made by connecting two plates made of a rigid polyvinyl chloride resin perpendicularly at the center of the plates and four ring brushes are attached to the frame. Each ring brush has a disk made of polypropylene having flexible polyurethane at the peripheral portions and polypropylene monofilaments are planted on the disk. FIG. 6 shows a perspective view of another embodiment of the floating brush used in the present invention. In this embodiment of the floating brush, a frame of a cross shape is made by connecting two plates made of a nylon resin perpendicularly at the center of the plates and two rows of nylon monofilaments, each having one line of the nylon filaments, are directly planted on the frame. By making the floating brush in any of the shapes shown in FIGS. 4 to 6, reversion of the brush by the ultrasonic vibration can be prevented.

In the process of the present invention, it is preferable that the diameter of the hair of the floating brush is 1.5 to 10 times the opening of the screen of the sieve. When the diameter of the hair of the floating brush is less than 1.5 times the opening of the screen of the sieve, there is the possibility that the hair of the floating brush is trapped into the opening of the screen and smooth floating cannot be achieve. When the diameter of the hair of the floating brush exceeds 10 times the opening of the screen of the sieve, there is the possibility that the effect of preventing attachment and accumulation of fine particles to the wire of the screen is not sufficiently exhibited.

Figure 7:
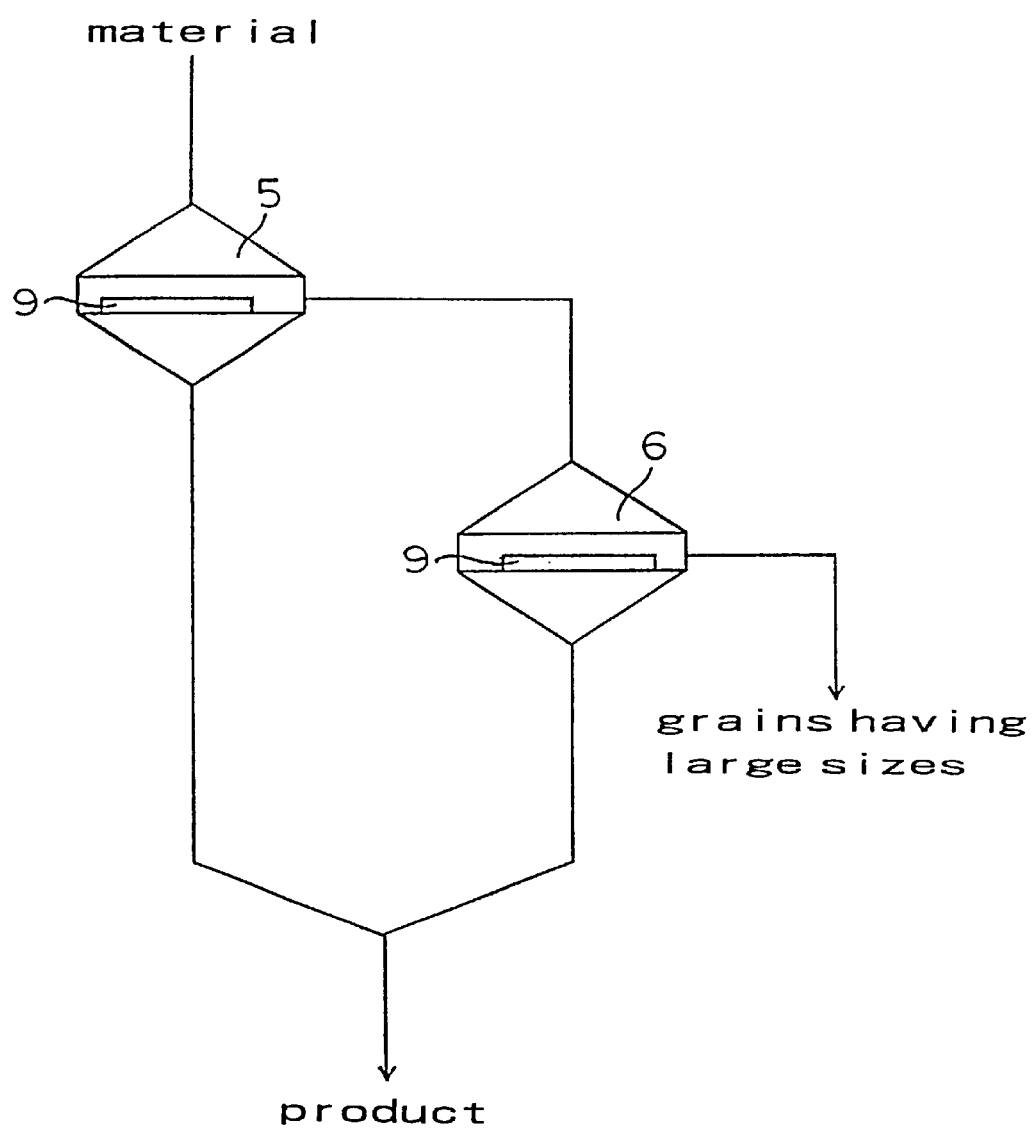
FIG. 7 shows a flow diagram of an embodiment of the process for classification of granular powder used in the process of the present invention.

In the process of the present invention, a plurality of ultrasonic vibration sieves having the floating brush placed on the surface of the screen of the sieve are arranged in series. The portion of the powder which is supplied to the ultrasonic vibration sieve placed at the upstream position and overflows the screen of this sieve can be supplied to the ultrasonic vibration sieve placed at the downstream position and classified. FIG. 7 shows a flow diagram of an embodiment of the process for classification of powder in which two ultrasonic vibration sieves having the floating brushes placed on the surface of the screens of the sieves are arranged in series. Material powder is supplied to the inlet for powder of the first ultrasonic vibration sieve 5 having a floating brush 9 placed on the surface of the screen and continuously discharged from outlets above and below the screen. The outlet above the screen of the first ultrasonic vibration sieve is connected to an inlet for powder of the second ultrasonic vibration sieve 6 having a floating brush 9 placed on the surface of the screen via canvas or the like. The powder supplied to the inlet for powder of the second ultrasonic vibration sieve is classified into components above and below the screen. The entire surface of the screen of the first ultrasonic vibration sieve is covered with the powder and always brushed by the floating brush which can move freely. The surface of the screen of the second ultrasonic vibration sieve is also brushed by the floating brush. Therefore, clogging due to the attachment of fine powder to wires is prevented in both ultrasonic vibration sieves and the capacity of classification can be increased remarkably.

In accordance with the process of the present invention, granular powder is classified by using the ultrasonic vibration sieve equipped with a screen of 149 $\mu$m or smaller and the granules of a polyvinyl chloride resin for preparation of paste can be prepared by classifying fine powder at a high speed and removing grains having large sizes efficiently without clogging of the sieve.

Embodiments of the present invention are described in the following.

(1) A process for producing granules of a polyvinyl chloride resin for preparation of paste which comprises spray-drying an aqueous dispersion of a vinyl chloride polymer obtained. by emulsion polymerization or micro polymerization of vinyl chloride or a mixture containing vinyl chloride as a main component and a monomer copolymerizable with vinyl chloride, classifying granular particles obtained by the spray-drying using ultrasonic vibration sieves which are equipped with a screen having an opening of 149 $\mu$m or smaller, removing plus sieve components and obtaining granules of a polyvinyl chloride resin for preparation of paste which comprise 10% by weight or less of components having diameters of 10 $\mu$m or smaller and less than 0.5% by weight of plus sieve components after classification using a 149 $\mu$m standard sieve in accordance with Japanese Industrial Standard, have a bulk density (loose) of 0.45 to 0.58 g/cm$^3$ and give a plastisol comprising less than 0.3% by weight of plus sieve components after classification using a 62 $\mu$m standard sieve in accordance with Japanese Industrial Standard, wherein the plastisol is obtained by placing 100 g of the granules of a polyvinyl chloride resin and 50 g of dioctyl phthalate in a cylindrical vessel having an inner diameter of 85 mm and mixing a resultant mixture by rotating a stirrer having four flat blades arranged in a form of a cross at a speed of 500 rpm for 5 minutes, each blade having a shape of a petal having a length of 35 mm from a center of a shaft of rotation, a width of 20 mm in a horizontal direction and a thickness of 0.7 mm and the stirrer being placed at a position such that lower faces of the blades are placed at a distance of 5 cm from a surface of a bottom of the vessel.

(2) A process for producing granules of a polyvinyl chloride resin for preparation of paste described in (1), wherein the granules comprise less than 0.1% by weight of plus sieve components after classification using a 149 $\mu$m standard sieve in accordance with Japanese Industrial Standard.

(3) A process for producing granules of a polyvinyl chloride resin for preparation of paste described in (1), wherein the granules have a bulk density (loose) of 0.48 to 0.56 g/cm$^3$.

(4) A process for producing granules of a polyvinyl chloride resin for preparation of paste described in (5), wherein the plastisol comprises less than 0.1% by weight of over size components after classification using a 62 $\mu$m standard sieve in accordance with Japanese Industrial Standard.

(5) A process for producing granules of a polyvinyl chloride resin for preparation of paste described in (1), wherein a temperature of heated air for drying which is used for the spray-drying is 100° C. or higher.

(6) A process for producing granules of a polyvinyl chloride resin for preparation of paste described in (1), wherein, to classify the granular particles obtained by the spray-drying by the ultrasonic vibration sieves which are equipped with a screen having an opening of 149 $\mu$m or smaller and remove the plus sieve components, a plurality of ultrasonic vibration sieves are arrange in series and a portion of granular particles which overflow an ultrasonic vibration sieve at an upstream position after being supplied to said sieve is supplied to an ultrasonic vibration sieve at a downstream position and classified.

(7) A process for producing granules of a polyvinyl chloride resin for preparation of paste described in (1), wherein a wire of a screen of the ultrasonic vibration sieve is plated with a metal.

(8) A process for producing granules of a polyvinyl chloride resin for preparation of paste described in (1), wherein, to classify the particles obtained by the spray-drying by the ultrasonic vibration sieves which are equipped with a screen having an opening of 149 $\mu$m or smaller and remove plus sieve components, a floating brush is placed on a surface of the screen of an ultrasonically vibrating sieve.

(9) A process for producing granules of a polyvinyl chloride resin for preparation of paste described in (8), wherein the floating brush is a single brush or a group of brushes having a plurality of brushes connected to one another and the maximum length of the brush or the group of brushes is longer than one half of the diameter of the frame of the sieve and smaller than the diameter of the frame of the sieve.

(10) A process for producing granules of a polyvinyl chloride resin for preparation of paste described in (8), wherein the diameter of the hair of the floating brush is 1.5 to 10 times the opening of the screen of the sieve.

EXAMPLES

The present invention will be described more specifically with reference to examples. However, the present invention is not limited to the examples.

In Examples and Comparative Examples, the evaluations were conducted in accordance with the following methods.

(1) Content of water

A sample of powder was dried at 110° C. for 1 hour and the content of water (% by weight) was calculated from the decrease in the weight.

(2) Average diameter of particles

The accumulated distribution of the diameter of particles of a sample of powder was measured in methanol as the solvent using a laser light diffraction particle sizer "MASTER SIZER" [manufactured by MALPARN Company] and the diameter of particles corresponding to 50% by weight was used as the average diameter ($\mu$m) of the particles.

(3) Amount of particles having diameters of 10 $\mu$m or smaller

When the average diameter of particles was obtained by the laser light diffraction particle sizer as described above, the fraction (% by weight) of fine particles having diameters of 10 $\mu$m or smaller was also obtained.

(4) Amount of particles having diameters of 149 $\mu$m or larger

On a standard sieve having an opening of 149 $\mu$m in accordance with Japanese Industrial Standard, 25 g of a sample of powder and 0.15 g of carbon black were placed and tapped for 15 minutes by a shaker. The fraction (% by weight) of grains having large sizes which remained on the sieve was obtained.

(5) Bulk density (loose)

The bulk density Goose) was measured in accordance with the method of Japanese Industrial Standard K 6721 using POWDER TESTER [manufactured by HOSOKAWA FUNTAIKOGAKU KENKYUUSHO Co., Ltd.].

(6) Angle of repose

A sample was supplied on the surface of a screen of a vibration sieve having an opening of 710 $\mu$m using POWDER TESTER manufactured by HOSOKAWA FUNTAIKOGAKU KENKYUUSHO Co., Ltd. The angle at the tail of the accumulation of the powder under a shoot was measured. The smaller the angle of repose, the more excellent the fluidity of the powder.

(7) Attachment (stickiness) of powder

A transfer pipe was constructed as follows: a straight pipe of 18-8 stainless steel which had the inner face polished to #200 by buffing and had a nominal diameter of 25A was laid in a horizontal distance of 23 m and one end of the pipe was connected to a vertical pipe having a length of 2 m in a right angle via an elbow joint. The air was supplied from the lower end toward the upper end of the transfer pipe by a blower at a speed of 20 m/second. A sample of powder stored in a silo was dropped at the lower end of the transfer pipe via a rotary valve placed. at the lower end of the silo and supplied to the transfer pipe. The sample of powder in an amount of 100 kg was continuously transferred under a transfer pressure of 0.2 to 0.3 kg/cm$^2$G at a receiver at the upper end of the transfer pipe. Then, the horizontal pipe of the transfer pipe was disconnected and the weight of the powder attached to the straight pipe having the length of 23 m was measured. From the result of the measurement, the amount of the attached powder per 1 m of the straight pipe was obtained and used as the index for the attachment of powder.

(8) Dispersion in a sol (Over size components on a 250 mesh sieve)

Into a cylindrical vessel having an inner diameter of 85 mm, 100 g of a sample of powder and 50 g of dioctyl phthalate were placed. At the center of the vessel in the horizontal direction, the stirrer shown in FIG. 1 was placed. In the stirrer, four flat blades 2 each having a shape of a petal, a length a of 35 mm from the center of the shaft of rotation, a width b of 20 mm in the horizontal direction and a thickness c of 0.7 mm were fixed to a fixing ring 3 (the height d of the ring: 14 mm; and the outer diameter e of the ring: 13 mm) at the lower end of the shaft of rotation 4 and arranged in a form of a cross. The stirrer 1 having the above structure was placed at a position such that lower faces of the blades were placed at a distance of 5 mm from the surface of the bottom of the vessel. The sample of powder and dioctyl phthalate in the vessel were mixed by rotation of the blades at the speed of 500 rpm for 5 minutes. The prepared plastisol was diluted with 100 g of mineral spirit and filtered using a 62 $\mu$m standard sieve in accordance with Japanese Industrial Standard (a nominal 250 mesh sieve). The over size components were transferred to a dish having a known weight by washing with methanol. Methanol was vaporized and the weight of the resin on the dish was obtained. The dispersion in the sol is expressed by the obtained weight (% by weight) per 100 g of the sample of powder. The smaller the value, the more excellent the dispersion of sol.

(9) Dispersion in a sol (Number of protrusions)

A plastisol was prepared in accordance with the same procedures as those conducted in (8). A release paper was coated with the prepared plastisol using a bar coater having a clearance of 100 $\mu$m without diluting the plastisol with mineral spirit. A sheet was prepared by heating the coated release paper in a Gear oven at 150° C. for 30 seconds. The number of protrusions in the area of 20 cm×10 cm of the sheet was counted by visual observation.

(10) Viscosity of a paste

In an atmosphere at a temperature of 25° C. and a relative humidity of 60%, 100 parts by weight of a polyvinyl chloride resin for preparation of paste and 60 parts by weight of dioctyl phthalate were mixed by a Raikaiki (a mortar and pestle type mixer). After the obtained plastisol was defoamed in a vacuum and left standing at a temperature of 25° C. for 1 hour, the viscosity of the plastisol was measured by a Brookfield viscometer of the BM type using rotor No. 3 at a speed of rotation of 6 rpm.

Example 1

An aqueous dispersion of a polyvinyl chloride resin which contained 100 parts by weight of a polyvinyl chloride resin composed of 92% by weight of particle components having a mode diameter of particles of 1.2 $\mu$m and 8% by weight of particle components having a mode diameter of particles of 0.2 $\mu$m and 1.0 part by weight of sodium dodecylbenzenesulfonate and had a concentration of solid components of 46% by weight was prepared in accordance with the seed emulsion polymerization. The dispersion was dried by a spray-drier equipped with an atomizer of a rotating disk type (the diameter: 210 mm; and the speed of rotation: 15,000 rpm) with a heated air having an absolute humidity of 0.01 kg water/kg air under the condition of the temperature at an inlet of 130° C. and the temperature at an outlet of 55° C. From the granular powder obtained by the spray-drying, grains having large sizes were removed by an ultrasonic vibration sieve [manufacture by TOKUJU Corporation; RESONASIEVE TMR-70-1S] with the 70% output of ultrasonic wave power (maximum 200W) vibrating at a frequency of 36 kHz and equipped with a low speed vibration motor (output: 0.75 kW; and frequency: 1,400 Hz) and a frame of sieve having a screen having an opening of 109 μm and a diameter of 700 mm. The phase angle of the low speed vibration was 70 degrees and the ultrasonic vibration was applied as high speed pulses.

The content of water in the obtained granules of a polyvinyl chloride resin for preparation of paste was 0.5% by weight. The average diameter of particles was 39.6 μm, the content of particles having diameters smaller than 10 μm was 7.7% by weight and the content of particles having diameters larger than 149 μm was 0.0010% by weight. The bulk density (loose) was 0.547 g/cm$^3$ and the angle of repose was 35 degrees. In the test of attachment of powder, no attachment to the straight horizontal pipe was found. In the test of dispersion in the sol, the amount of the over size components on the 250 mesh sieve was 0.06% by weight and the number of protrusions was 3. The viscosity of the paste was 2,500 cp.

Example 2

A granular powder obtained by polymerization and drying in accordance with the same procedures as those conducted in Example 1 was classified by the ultrasonic vibration sieve in accordance with the same procedures as those conducted in Example 1 except that the low speed vibration motor was not operated. Due to the stalled operation of the low speed vibration motor, powder which had passed the screen of the sieve was accumulated under the sieve and the time required for the classification was about 20 times as much as the time required in Example 1.

The content of water in the obtained granules of a polyvinyl chloride resin for preparation of paste was 0.5% by weight. The average diameter of particles was 40.0 μm, the content of particles having diameters smaller than 10 μm was 8.1% by weight and the content of particles having diameters larger than 149 μm was 0.0010% by weight. The bulk density (loose) was 0.550 g/cm$^3$ and the angle of repose was 34 degrees. In the test of attachment of powder, no attachment to the straight horizontal pipe was found. In the test of dispersion in the sol, the amount of the over size components on the 250 mesh sieve was 0.10% by weight and the number of protrusions was 3. The viscosity of the paste was 2,500 cp.

Comparative Example 1

From a granular powder obtained by polymerization and drying in accordance with the same procedures as those conducted in Example 1, grains having large sizes were removed by using a pneumatic sieve of the fixed screen type [manufactured by SHINTOKYO KIKAI Co., Ltd., HIBOLTER NR-300] equipped with a screen having a diameter of 30 cm, an opening of 104 μmu and an open fraction of 37.4%.

The content of water in the obtained granules of a polyvinyl chloride resin for preparation of paste was 0.6% by weight. The average diameter of particles was 31.1 μm, the content of particles having diameters smaller than 10 μm was 21.4% by weight and the content of particles having diameters larger than 149 μm was 0.0015% by weight. The bulk density (loose) was 0.410 g/cm$^3$ and the angle of repose was 45 degrees. In the test of attachment of powder, the amount of the powder attached to the straight horizontal pipe was 10 g/m. In the test of dispersion in the sol, the amount of the over size components on the 250 mesh sieve was 0.42% by weight and the number of protrusions was 3. The viscosity of the paste was 2,500 cp.

Comparative Example 2

A granular powder obtained by polymerization and drying in accordance with the same procedures as those conducted in Example 1 was evaluated without classification. The content of water was 0.6% by weight. The average diameter of particles was 39.7 μm, the content of particles having diameters smaller than 10 μm was 7.8% by weight and the content of particles having diameters larger than 149 μm was 0.20% by weight. The bulk density (loose) was 0.510 g/cm$^3$ and the angle of repose was 38 degrees. In the test of attachment of powder, no attachment of the powder to the straight horizontal pipe was found. In the test of dispersion in the sol, the amount of the over size components on the 250 mesh sieve was 0.72% by weight and the number of protrusions was 80. The viscosity of the paste was 2,500 cp.

Comparative Example 3

An aqueous dispersion of a polyvinyl chloride resin obtained by polymerization in accordance with the same procedures as those conducted in Example 1 was spray-dried in accordance with the $_1$same procedures as those conducted in Example 1 except that an air having an absolute humidity of 0.01 kg water/kg air was used, the temperature at the inlet was adjusted to 80° C. and the temperature at the outlet was adjusted to 45° C. Drying speed was one half of that in Example 1.

The content of water in the obtained granules of a polyvinyl chloride resin for preparation of paste was 0.7% by weight. The average diameter of particles was 39.8 μm, the content of particles having diameters smaller than 10 μm was 7.7% by weight and the content of particles having diameters larger than 149 μm was 0.22% by weight. In the particles having diameters of 149 μm or larger, slightly red foreign materials which were considered to be portions cleaved from the resin layer attached to the inner walls of the main part of the drying apparatus and the collecting apparatuses and mixed into the powder. The bulk density (loose) was 0.547 g/cm$^3$ and the angle of repose was 39 degrees. In the test of attachment of powder, no attachment of powder to the straight horizontal pipe was found. In the test of dispersion in the sol, the amount of the over size components on the 250 mesh sieve was 0.33% by weight and the number of protrusions was 45. The viscosity of the paste was 2,200 cp.

Comparative Example 4

The same procedures as those conducted in Example 1 were conducted except that the ultrasonic oscillation of the ultrasonic vibration sieve was not operated. The screen of the sieve clogged due to attachment of powder 20 seconds after the start of the classification and the classification could not be continued.

The results of evaluation of the properties in Examples 1 and 2 and Comparative Examples 1 to 3 are shown in Table 1.

TABLE 1

|  | Example | | Comparative Example | | |
| --- | --- | --- | --- | --- | --- |
|  | 1 | 2 | 1 | 2 | 3 |
| Content of water (% by weight) | 0.5 | 0.5 | 0.6 | 0.6 | 0.7 |
| Average diameter of particles ($\mu$m) | 39.6 | 40.0 | 31.1 | 39.7 | 39.8 |
| Amount of particles having diameters of 10 $\mu$m or smaller (% by weight) | 7.7 | 8.1 | 21.4 | 7.8 | 7.7 |
| Amount of particles having diameters of 149 $\mu$m or larger (% by weight) | 0.0010 | 0.0010 | 0.0015 | 0.20 | 0.22 |
| Bulk density (loose) (g/cm$^3$) | 0.547 | 0.550 | 0.410 | 0.510 | 0.547 |
| Angle of repose (degree) | 35 | 34 | 45 | 38 | 39 |
| Amount of attached powder (g/m) | 0 | 0 | 10 | 0 | 0 |
| Dispersion of sol |  |  |  |  |  |
| amount of over size components on 250 mesh sieve (% by weight) | 0.06 | 0.10 | 0.42 | 0.72 | 0.33 |
| number of protrusions | 3 | 3 | 3 | 80 | 45 |
| Viscosity of paste (cp) | 2500 | 2500 | 2500 | 2500 | 2200 |

As shown in Table 1, the granules of a polyvinyl chloride resin for preparation of paste of the present invention had high bulk densities and small angles of repose, exhibited excellent powder fluidity and no attachment of powder and provided plastisols exhibiting excellent dispersion in the sol. In Example 2, it took a longer time for the classification to obtain the granules of a polyvinyl chloride resin for preparation of paste but the obtained resin granules exhibited properties as excellent as those of resin granules in Example 1.

In contrast, the granules of a polyvinyl chloride resin for preparation of paste of Comparative Example 1 which were classified by using a pneumatic sieve of a fixed screen type exhibited a great angle of repose, i.e., poor powder fluidity, and marked attachment of powder because the granules contained a greater amount of fine particles having diameters of 10 $\mu$m or smaller. The granular powder of Comparative Example 2 which was not classified contained a relatively great amount of grains having diameters of 149 $\mu$m or larger and a great amount of the over size components on the 250 mesh standard sieve and a plastisol of poor dispersion giving many protrusions was obtained. In the granules of Comparative Example 3 which were obtained by the spray-drying using an air at a low temperature and were not classified; colored foreign materials were contained in the particles having diameters of 149 $\mu$m or greater and a plastisol of poor dispersion giving many protrusions were obtained.

Example 3

An aqueous dispersion (the concentration of solid components: 48% by weight) of a polyvinyl chloride resin having a mode diameter (based on the weight) of particles of 1.8 $\mu$m and a distribution of the diameter of particles as broad as 0.2 to 6 $\mu$m, which was prepared in accordance with the micro suspension polymerization, was spray-dried as follows: the dispersion was sprayed by rotation of an atomizer of a rotating disk type (diameter: 210 mm) at a speed of rotation of 19,200 rpm; using an air having an absolute humidity of 0.01 kg water/kg air, the air heated to 170° C. and the dispersion were passed in parallel from the top of a column to the bottom of the column; and the temperature at an outlet at the bottom of the column was adjusted to 55° C. The bulk density (loose) of the obtained granular powder of the resin was 0.51 g/cm$^3$, the angle of repose was 40±1 degrees, the content of particles having diameters of 109 $\mu$m or larger was 0.5% by weight and the content of particles having diameters smaller than 53 $\mu$m was 29.9% by weight. This granular powder is referred to as resin granular powder A.

Two ultrasonic vibration sieves [manufactured by TOKUJU Corporation; RESONASIEVE TMR-70; a screen of 150 mesh; the opening: 109 $\mu$m; the diameter of the screen: 622 mm; the effective area of the screen: 0.304 m$^2$; and the material of the wire: 18-8 stainless steel] were arranged in series as shown in FIG. 2. The ultrasonic vibration sieves were operated in the conditions of a phase angle of vibration of the sieve frame of 70 degrees, an output of the ultrasonic wave of 70% (maximum 200 W) and the vibration applied as high speed pulses.

Into the ultrasonic vibration sieve placed at the upstream position, resin granular powder A was supplied at a speed of 16.23 kg/minute. The resin in an amount of 12.85 kg/minute passed the screen of the sieve and dropped below the screen. The resin in an amount of 3.38 kg/minute overflowed the screen and was supplied to the ultrasonic vibration sieve at the downstream position.

In the ultrasonic vibration sieve at the downstream position, the resin in an amount of 3.32 kg/minute passed the screen of the sieve and dropped below the screen. The resin in an amount of 0.06 kg/minute was discharged from the screen as the grains having large sizes.

In other words, in accordance with the process of the present invention in which classification was conducted using two ultrasonic vibration sieves arranged in series, resin granular powder A was classified at the speed of classification of 16.23 kg/minute and the yield below the screen of 99.6%, which was obtained as the ratio of the amount of the recovered powder 12.85 kg/minute+3.32 kg/minute 16.17 kg/minute to the amount of the supplied powder 16.23 kg/minute. i The granules of a polyvinyl chloride resin for preparation of paste can be obtained by the almost complete classification.

The average diameter of particles in the obtained granules of a polyvinyl chloride resin for preparation of paste was 34 $\mu$m, the content of particles having diameters smaller than 10 $\mu$m was 9.0% by weight and the content of particles having diameters larger than 149 $\mu$m was 0.0072% by weight. The bulk density (loose) was 0.531 g/cm$^3$ and the angle of repose was 50 degrees. In the test of dispersion in the sol, the amount of the over size components on the 250 mesh sieve was 0.22% by weight and the number of protrusions was 6. The viscosity of the paste was 2,500 cp.

Comparative Example 5

Resin granular powder A was classified by operating one ultrasonic vibration sieve which was the same as that used in Example 3 in the same condition as that in Example 3.

The maximum speed of supply of resin granular powder A for the classification was 3.71 kg/minute. The resin in an amount of 3.69 kg/minute passed the screen of the sieve and dropped below the screen. The powder in an amount of 0.02 kg/minute was discharged from the screen as the grains having large sizes.

It is shown by these results that a speed of classification of 7.42 kg/minute and a yield below the screen of 99.5% was achieved by the classification of resin granular powder A using two ultrasonic vibration sieve arrange in series and the almost complete classification could be performed.

Example 4

In accordance with the same procedures as those conducted in Example 3 except that the speed of rotation of the atomizer of the rotating disk type was adjusted to 12,800 rpm, a resin granular powder was obtained. The bulk density (loose) of the obtained granular powder of the resin was 0.52 g/cm$^3$, the angle of repose was 43±1 degrees, the content of particles having diameters of 109 μm or greater was 13.4% by weight and the content of particles having diameters smaller than 53 μm was 17.3% by weight. This granular powder is referred to as resin granular powder B.

Resin granular powder B was classified using the same apparatus as that used in Example 3 in which two ultrasonic vibration sieves were arranged in series in the same condition as that in Example 3.

Into the ultrasonic vibration sieve placed at the upstream position, resin granular powder B was supplied at a speed of 1.68 kg/minute. The resin in an amount of 1.19 kg/minute passed the screen of the sieve and dropped below the screen. The resin in an amount of 0.49 kg/minute overflowed the screen and was supplied to the ultrasonic vibration sieve at the downstream position.

In the ultrasonic vibration sieve at the downstream position, the resin in an amount of 0.24 kg/minute passed the screen of the sieve and dropped below the screen. The resin in an amount of 0.25 kg/minute was discharged form the screen as grains having large sizes.

In other words, in accordance with the process of the present invention in which classification was conducted using two ultrasonic vibration sieves arranged in series, resin granular powder B was classified at the speed of classification of 1.68 kg/minute and the yield below the screen of 85.1%. The granules of a polyvinyl. chloride resin for preparation of paste could be obtained by the almost complete classification.

The average diameter of particles in the obtained granules of a polyvinyl chloride resin for preparation of paste was 55 μm, the content of particles having diameters smaller than 10 μm was 8.0% by weight and the content of particles having diameters larger than 149 μm was 0.0089% by weight. The bulk density (loose) was 0.553 g/cm$^3$ and the angle of repose was 46 degrees. In the test of dispersion in the sol, the amount of the over size components on the 250 mesh sieve was 0.25% by weight and the number of protrusions was 10. The viscosity of the paste was 2,500 cp.

Comparative Example 6

Resin granular powder B was classified by operating one ultrasonic vibration sieve which was the same as that used in Example 3 in the same condition as that in Example 3.

The maximum speed of supply of resin granular powder A for the classification was 0.56 kg/minute. The resin in an amount of 0.45 kg/minute passed the screen of the sieve and dropped below the screen. The resin in an amount of 0.11 kg/minute was discharged from the screen as the grains having large sizes. Therefore, the yield below the screen was 80.4%.

It is shown by these results that a speed of classification of 1.12 kg/minute and a yield below the screen of 80.4% was obtained by the classification of resin granular powder B using two ultrasonic vibration sieves arrange in parallel. The yield below the screen of 80.4% is markedly lower than the yield below the screen of 85.1% obtained in Example 2 by using two ultrasonic vibration sieves arranged in series and it is understood that a considerable amount of the powder overflowed the screen.

Example 5

Resin granular powder B was classified using the same apparatus as that used in Example 3 in which two ultrasonic vibration sieves were arranged in series except that the wire of the ultrasonic vibration sieves was a polyester fiber plated with nickel.

Into the ultrasonic vibration sieve placed at the upstream position, resin granular powder B was supplied at a speed of 3.83 kg/minute. The resin in an amount of 3.94 kg/minute passed the screen of the sieve and dropped below the screen. The resin in an amount of 0.89 kg/minute overflowed the screen and was supplied to the ultrasonic vibration sieve at the downstream position.

In the ultrasonic vibration sieve at the downstream position, the resin in an amount of 0.42 kg/minute passed the screen of the sieve and dropped. The resin in an amount of 0.47 kg/minute was discharged form the screen as the grains having large sizes.

In other words, in accordance with the process of the present invention in which classification was conducted using two ultrasonic vibration sieves arranged in series, resin granular powder B was classified at the speed of classification of 3.83 kg/minute and the yield below the screen of 87.7%. The granules of a polyvinyl chloride resin for preparation of paste could be obtained by the almost complete classification.

The average diameter of particles in the obtained granules of a polyvinyl chloride resin for preparation of paste was 56 μm, the content of particles having diameters smaller than 10 μm was 9.0% by weight and the content of particles having diameters larger than 149 μm was 0.0010% by weight. The bulk density (loose) was 0.544 g/cm$^3$ and the angle of repose was 46 degrees. In the test of dispersion in the sol, the amount of the over size components on the 250 mesh sieve was 0.22% by weight and the number of protrusions was 10. The viscosity of the paste was 2,500 cp.

The results of the classification in Examples 3 to 5 and Comparative Examples 5 and 6 are shown in Table 2. The results in Comparative Examples are shown as calculated values corresponding to those obtained by using two ultrasonic vibration sieves.

TABLE 2

| Example | 3 | | | 4 | | | 5 | |
| --- | --- | --- | --- | --- | --- | --- | --- | --- |
| Comparative Example | | | 5 | | | 6 | | |
| Resin for classification | resin granular powder A | | | resin granular powder B | | | | |
| Wire of screen | 18-8 Stainless steel | | | 18-8 Stainless steel | | | polyester fiber plated with nickel | |
| Ultrasonic vibration sieve | first sieve | second sieve | two | first sieve | second sieve | two | first sieve | second sieve |
| Amount of supply (kg/min.) | 16.23 | 3.38 | 7.42 | 1.68 | 0.49 | 1.12 | 3.83 | 0.89 |
| Amount of components above screen (kg/min.) | 3.38 | 0.06 | 0.04 | 0.49 | 0.25 | 0.22 | 0.89 | 0.47 |
| Amount of components below screen (kg/min.) | 12.85 | 3.32 | 7.38 | 1.19 | 0.24 | 0.90 | 2.94 | 0.42 |
| Speed of classification (kg/min) | 16.23 | | 7.42 | 1.68 | | 1.12 | 3.83 | |
| Yield below screen (%) | 99.6 | | 99.5 | 85.1 | | 80.4 | 87.7 | |
| Condition of operation | excellent | | excellent | excellent | | tend to overflow | excellent | |

When the results in Examples 3 and 4 are compared with the results in Comparative Examples 5 and 6, respectively, shown in Table 2, it is understood that, when the same resin granular powder was used, the process of the present invention in which two ultrasonic vibration sieves were arranged in series could achieve a speed of classification faster by 1.5 to 2.2 times and a yield below the screen higher than those obtained in a conventional process in which two ultrasonic vibration sieves were arranged in parallel. Incomplete classification in which fine particles which should have passed the screen were mixed with grains having large sizes did not take place either in the process of the present invention. When the result in Example 4 is compared with the result in Example 5, it is understood that, when the same resin granular powder was classified, the speed of classification in Example 5 in which a fiber plated with a metal was used as the wire of the screen of the sieve was greater than that in Example 4 in which stainless steel was used as the wire of the screen of the sieve and more efficient classification could be achieved in Example 5.

The results of evaluation of granules of a polyvinyl chloride resin for preparation of paste obtained in Examples 3 to 5 are shown in Table 3.

TABLE 3

| | Example 3 | Example 4 | Example 5 |
| --- | --- | --- | --- |
| Average diameter of particles ($\mu$m) | 34 | 55 | 56 |
| Amount of particles having diameters of 10 $\mu$m or smaller (% by weight) | 9.0 | 8.0 | 9.0 |
| Amount of particles having diameters of 149 $\mu$m or larger (% by weight) | 0.0072 | 0.0089 | 0.0010 |
| Bulk density (loose) (g/cm$^3$) | 0.531 | 0.553 | 0.544 |
| Angle of repose (degree) | 50 | 46 | 46 |
| Dispersion of sol amount of over size components on 250 mesh sieve (% by weight) | 0.22 | 0.25 | 0.22 |
| number of protrusions | 6 | 10 | 10 |
| Viscosity of paste (cp) | 2500 | 2500 | 2500 |

It is shown by the results in Table 3 that granules of a polyvinyl chloride resin for preparation of paste which exhibit excellent powder fluidity and excellent dispersion into plasticizers in the preparation of paste could be obtained in accordance with the process of the present invention.

Example 6

An aqueous dispersion (the concentration of solid components: 48% by weight) of a polyvinyl chloride resin having a mode diameter (based on the weight) of particles of 1.8 $\mu$m and a distribution of the diameter of particles as broad as 0.2 to 6 $\mu$m, which was prepared in accordance with the micro suspension polymerization, was spray-dried as follows: the dispersion was sprayed by rotation of an atomizer of a rotating disk type at a speed of rotation of 19,200 rpm; using an air having an absolute humidity of 0.01 kg water/kg air, the air heated to 130° C. and the dispersion were passed in parallel from the top of a column to the bottom of the column; and the temperature at an outlet at the bottom of the column was adjusted to 55° C. The bulk density (loose) of the obtained granular powder of the resin was 0.51 g/cm$^3$, the bulk density (tight) was 0.71 g/cm$^3$, the angle of repose was 40±1 degrees, the content of particles having diameters of 109 $\mu$m or greater was 1.0% by weight and the content of particles having diameters smaller than 53 $\mu$m was 29.9% by weight. This granular powder is referred to as resin granular powder C.

On the surface of a screen of an ultrasonic vibration sieve [manufactured by TOKUJU Corporation; RESONASIEVE TMR-70; a screen of 150 mesh; the opening: 109 $\mu$m; the diameter of the screen: 622 mm; the effective area of the screen: 0.304 m$^2$; and the material of the wire: 18-8 stainless steel], a floating brush having the shape shown in FIG. 6 in which each frame of the cross made of nylon had a length of 600 mm and two rows of a single line of nylon monofilaments having a diameter of 0.3 mm and a height of 20 mm were planted to the frame. The ultrasonic vibration sieve was operated in the conditions of a phase angle of vibration of the sieve frame of 70 degrees, an output of the ultrasonic wave of 70% (maximum 200 W) and the vibration applied as high speed pulses. The operation was conducted in a condition such that the outlet above the screen was closed during the classification and, 30 seconds after stopping the supply of the powder, the outlet was opened to discharge the over size components.

Using a screw feeder, the granular powder of the resin was intermittently supplied in an amount of about 230 kg/hour in each supplying period of 5 minutes and classified. This operation was repeated 8 times. In the first operation, the amount of the minus sieve components was 17.62 kg, the amount of the over size components was 0.13 kg and the yield below the screen was 99.3%. In the eighth operation, the amount of the minus sieve components was 17.46 kg, the amount of the over size components was 0.10 kg and the yield below the screen was 99.4%, wherein the yield below the screen was obtained as the ratio of the accumulated amount of the minus sieve components to the amount of the supplied resin. The granules of a polyvinyl chloride resin for preparation of paste could be produced under an excellent condition of the operation.

The average diameter of particles in the obtained granules of a polyvinyl chloride resin for preparation of paste was 33 $\mu$m, the content of particles having diameters smaller than 10 $\mu$m was 9.0% by weight and the content of particles having diameters larger than 149 $\mu$m was 0.0095% by weight. The bulk density Goose) was 0.542 g/cm$^3$ and the angle of repose was 50 degrees. In the test of dispersion in the sol, the amount of the over size components on the 250 mesh sieve was 0.25% by weight and the number of protrusions was 10. The viscosity of the paste was 2,500 cp.

Comparative Example 7

The operation of the classification of resin granular powder C conducted in Example 6 was further continued after removing the floating brush on the surface of the screen.

In the first operation, the amount of the minus sieve components was 15.74 kg, the amount of the over size components was 2.67 kg and the yield below the screen was 85.5%. In the eighth operation, the amount of the minus sieve components was 9.21 kg, the amount of the over size components was 9.15 kg and the yield below the screen was 50.2%. During the operation, the powder tended to overflow.

The results of the classifications in Example 6 and Comparative Example 7 are shown in Table 4. The results of the evaluation of the properties of the granules of a polyvinyl chloride resin for preparation of paste obtained in Example 6 are shown in Table 5.

TABLE 4

| | Example 6 | | Comparative Example 7 | |
| --- | --- | --- | --- | --- |
| Floating brush | present | | absent | |
| Speed of supply of resin (kg/hr) | about 230 | | about 230 | |
| Time of supply (min) | 5 | | 5 | |
| Number of repeating | first | eighth | first | eighth |
| Amount discharged above screen (kg) | 0.13 | 0.10 | 2.67 | 9.15 |
| Amount discharged below screen (kg) | 17.62 | 17.46 | 15.74 | 9.21 |
| Yield (%) | 99.3 | 99.4 | 85.5 | 50.2 |
| Condition of operation | excellent | | tend to overflow | |

TABLE 5

| | Example 6 |
| --- | --- |
| Average diameter of particles ($\mu$m) | 33 |
| Amount of particles having diameters of 10 $\mu$m or smaller (% by weight) | 9.0 |
| Amount of particles having diameters of 149 $\mu$m or larger (% by weight) | 0.0095 |
| Bulk density (loose) (g/cm$^3$) | 0.542 |
| Angle of repose (degree) | 50 |
| Dispersion of sol | |
| amount of over size components on 250 mesh sieve (% by weight) | 0.25 |
| number of protrusions | 10 |
| Viscosity of paste (cp) | 2500 |

As shown in Table 4, in Example 6 in which the floating brush was placed on the surface of the screen of the ultrasonic vibration sieve, the classification could be performed at a high yield in the excellent condition of operation even after the classification had been repeated 8 times in the classification of a powder as fine as a powder containing about 30% by weight of particles having diameters smaller than 53 $\mu$m. In contrast, in Comparative Example 7 in which the floating brush was removed from the surface of the screen, the yield was lower even in the first classification and rapidly decreased to about 50% in the eighth classification. Moreover, the powder tended to overflow during the operation. These results show that placing the floating brush on the surface of the screen can suppress attachment and growth of fine particles on the wire of the screen, can maintain the excellent speed of classification for a long time and exhibits a great advantageous effect on producing the granules of a polyvinyl chloride resin for preparation of paste with stability.

It can be understood from the results in Table 5 that granules of a polyvinyl chloride resin for preparation of paste exhibiting excellent powder fluidity and excellent dispersion into plasticizers in the preparation of paste could be obtained.

INDUSTRIAL APPLICABILITY

The granules of a polyvinyl chloride resin for preparation of paste obtained in accordance with the process of the present invention does not cause significant attachment of powder and exhibits excellent powder fluidity and excellent dispersion into plasticizers in the preparation of plastisol. Therefore, the granules are suitable for bulk transportation and automatic measurement. Coated products having few particulate protrusions or striae can be obtained.

What is claimed is:

1. A process for producing granules of polyvinyl chloride resin for preparation of paste. comprising the steps of:

spray-drying an aqueous dispersion of a vinyl chloride polymer obtained by emulsion polymerization or fine suspension polymerization of vinyl chloride or a mixture containing vinyl chloride as a main component and a monomer copolymerizable with vinyl chloride;

classifying granular particles obtained by the spray-drying using ultrasonic vibration sieves which are equipped with a screen having an opening of 149 $\mu$m or smaller;

removing plus sieve components; and obtaining granules of polyvinyl chloride resin for preparation of paste, which:

comprise 10% by weight or less of components having diameters of 10 $\mu$m or smaller and less than 0.5% by weight of plus sieve components after classification using a 149 $\mu$m standard sieve in accordance with Japanese Industrial Standard:

have a bulk density (loose) of 0.45 to 0.58 g/cm$^3$; and give a plastisol comprising less than 0.3% by weight of plus sieve components after classification using a 62 $\mu$m standard sieve in accordance with Japanese Industrial Standard, wherein the plastisol is obtained by placing 100 g of the granules of a polyvinyl chloride resin and 50 g of dioctyl phthalate in a cylindrical vessel having an inner diameter of 85 mm and mixing a resultant mixture by rotating a stirrer having four flat blades arranged in a form of a cross at a speed of 50 rpm for 5 minutes. each blade having a shape of a petal having a length of 35 mm from a center of a shaft of rotation, a width of 20 mm in a horizontal direction and a thickness of 0.7 mm and the stirrer being placed at a position such that lower faces of the blades are placed at a distance of 5 cm from a surface of a bottom of the vessel.

2. A process for producing granules of a polyvinyl chloride resin for preparation of paste according to claim 1, wherein a temperature of heated air for drying which is used for the spray-drying is 100° C. or higher.

3. A process for producing granules of a polyvinyl chloride resin for preparation of paste according to claim 1, wherein, to classify the granular particles obtained by the spray-drying by the ultrasonic vibration sieves which are equipped with a screen having an opening of 149 $\mu$m or smaller and remove the plus sieve components, a plurality of ultrasonic vibration sieves are arranged in series and a portion of granular particles which overflow an ultrasonic vibration sieve at an upstream position after being supplied to said sieve is supplied to an ultrasonic vibration sieve at a downstream position and classified.

4. A process for producing granules of a polyvinyl chloride resin for preparation of paste according to claim 1, wherein, to classify the particles obtained by the spray-drying by the ultrasonic vibration sieves which are equipped with a screen having an opening of 149 $\mu$m or smaller and remove plus sieve components, a floating brush is placed on a surface of the screen of an ultrasonically vibrating sieve.

* * * * *